United States Patent [19]

Tsurumaru et al.

[11] Patent Number: 5,064,890
[45] Date of Patent: Nov. 12, 1991

[54] NOISE INSULATING MATERIAL

[75] Inventors: Hidekazu Tsurumaru, Osaka; Nobuhiro Fujio, Akashi; Takeshi Yamasaki, Higashiosaka; Isao Negishi, Kawaguchi; Toshio Nishizaki, Urawa; Takashi Suzuki, Saitama, all of Japan

[73] Assignees: Tatsuta Electric Wire and Cable Co., Ltd., Osaka; Nippon Mining Co., Ltd.; Misawa Home Ltd., both of Tokyo, all of Japan

[21] Appl. No.: 618,524

[22] Filed: Nov. 26, 1990

Related U.S. Application Data

[63] Continuation of Ser. No. 90,067, Aug. 27, 1987, abandoned.

[30] Foreign Application Priority Data

Aug. 30, 1986 [JP] Japan ................ 61-204048
Aug. 30, 1986 [JP] Japan ................ 61-204049
Nov. 14, 1986 [JP] Japan ................ 61-272721
Nov. 14, 1986 [JP] Japan ................ 61-272722

[51] Int. Cl.$^5$ ............................................. C08K 5/16
[52] U.S. Cl. ...................................... 524/209; 524/205; 524/434; 524/442; 524/452; 524/464
[58] Field of Search ............... 524/209, 205, 434, 442, 524/452

[56] References Cited

U.S. PATENT DOCUMENTS

| | | | |
|---|---|---|---|
| 4,250,064 | 2/1981 | Chandler | 524/524 |
| 4,309,332 | 1/1982 | Fischer et al. | 524/524 |
| 4,322,575 | 3/1982 | Skipper | 524/524 X |
| 4,325,858 | 4/1982 | Saito et al. | 524/524 |
| 4,391,857 | 7/1983 | Saito et al. | 524/524 |
| 4,514,539 | 4/1985 | Hattrich et al. | 524/524 |
| 4,791,160 | 12/1988 | Kato et al. | 524/524 |

OTHER PUBLICATIONS

Patent Abstracts of Japan, vol. 11, No. 214 (C-434) [2661], 10th Jul. 1987; & JP-A-62 33 887 (Nippon Mining Co., Ltd.) 13-02-1987.

European Search Report, Application No. EP 87112344.

Patent Abstracts of Japan, vol. 10, No. 219 (C-363) [2275], 31st Jul. 1986; & JP-A-61 57 632 (Shintetsukusu K.K.) 24-03-1986.

Patent Abstracts of Japan, vol. 7, No. 263 (C-196) [1408], 24th Nov. 1983; & JP-A-58 145 613 (Denki Kagaku Kogyo K.K.) 30-08-1983.

Primary Examiner—Joseph L. Schofer
Assistant Examiner—J. M. Reddick
Attorney, Agent, or Firm—Jordan and Hamburg

[57] ABSTRACT

The noise insulating material comprises a binder resin, sound barrier filler, liquid rubber and fire-resistant fiber. The incorporation of fire-resistant fiber in the binder resin reinforces the resin matrix to prevent melting and shedding of the binder resin upon exposure to a flame. Being qualified as a quasi-incombustible material, this noise insulating material can be used in a broad range of applications.

10 Claims, No Drawings

NOISE INSULATING MATERIAL

This application is a continuation of application Ser. No. 07/090,067, filed Aug. 27, 1987.

BACKGROUND OF THE INVENTION a. Field of the Invention

This invention relates to a flexible noise insulating material comprising a molded composition of iron oxide silicate powder and binder resin and more particularly to a noise insulating material excelling in flame retardation and fire proofness.

b. Brief Description of the Prior Art

There are known a variety of flexible noise insulating materials each comprising a molded mixture of inorganic particles having a high specific gravity and a resin binder (Japanese Patent Publication No. 55-21052 and No. 58-25375, Japanese Laid-open Patent Publication No. 57-34064 and No. 61-57632). Such noise insulating materials are processed into sheets for installation on the floors and walls of automobiles, rolling stock, buildings, and so on. Noise insulating materials are also used widely in composite materials as laminates with steel sheets, nonwoven fabrics, concrete panels, wooden boards and so on.

Since the sound insulating effect of a noise insulating material is subject to the mass law of sound insulation as given below, it is necessary that its surface density be increased by incorporating a filler having a large specific gravity in a binder resin with good workability in a high proportion.

$$TL = a \log mf + b$$

wherein TL is a transmission loss (dB), m is a surface density (kg/m$^2$), f is a frequency (Hz) and a and b each is a constant. The term "surface density" means the weight (kg) per unit thickness and unit area, and generally the weight of a sheet per 1 mm thickness and 1 m$^2$ area is called the surface density of the sheet.

Then, in order that a noise insulating material may be successfully used as a building material, it must be possessed not only of high noise insulating performance but also of flame retardant property, i.e. resistance to combustion in the event of a fire, and fire proofness, i.e. resistance to propagation of a flame.

However, the hithereto-known noise insulating materials are unsatisfactory in flame retardant property and fire proofness if they are satisfactory in high sound insulation performance. Thus, on exposure to a flame, the binder resin melts off to cause cracks so that the propagation of the flame cannot be prevented. Particularly when the surface density of the noise insulating material is increased by incorporating a sound barrier filler of high specific gravity in large quantities, the binder resin melted by the flame fails to support the filler and melts away, thus permitting a propagation of the flame.

SUMMARY OF THE INVENTION

The object of this invention is to provide a noise insulating material possessing excellent flame retardant property and fire proofness such that, even on exposure to flames, it is hardly combusted, does not melt away, is not cracked, and arrests propagation of flames effectively.

The above object is accomplished by a noise insulating material comprising a binder resin and a sound barrier filler as supplemented with a fire-resistant fiber and a liquid rubber.

Furthermore, the noise insulating material of this invention is excellent in sound insulation property, mechanical strength, and processability.

DETAILED DESCRIPTION OF PREFERRED EMBODIMENTS

The noise insulating material according to this invention comprises a binder resin, a sound barrier filler, liquid rubber and fire-resistant fiber.

The binder resin to be employed in this invention is preferably an ethylene-vinyl acetate copolymer alone or a mixture of a vinyl chloride resin with a plasticizer and an ethylene-vinyl acetate copolymer and/or an ethylene-vinyl acetate-vinyl chloride terpolymer. Of them, the former does not produce black smoke on exposure to a flame, while the latter makes for high density loading with a sound barrier filler, thus permitting the manufacture of a noise insulating material with a high surface density.

In the ethylene-vinyl acetate copolymer and the ethylene-vinyl acetate-vinyl chloride terpolymer respectively, the vinyl acetate content is not less than 15 percent by weight and preferably 30 to 80 percent by weight. With a vinyl acetate content of less than 15 percent by weight, the sound barrier filler cannot be incorporated to a high packing factor so that the resulting noise insulating material will have only a low surface density and a poor sound insulation effect.

The vinyl chloride resin may for example be polyvinyl chloride, ethylene-vinyl chloride copolymer, vinyl acetate-vinyl chloride copolymer or urethanevinyl chloride copolymer.

The plasticizer may be virtually any plasticizer that is commonly used in vinyl chloride resin.

The sound barrier filler to be used in this invention is preferably a powder composed of 50 to 80 weight % of iron oxide, 15 to 30 weight % of silicon Oxide (SiO$_2$) and not more than 10 weight % of alkali metal oxide and/or alkaline earth metal oxide, with at least 50% of said iron oxide and silicon oxide being in the form of nFeO·SiO$_2$ or nFeO·Fe$_2$O$_3$·SiO$_2$ (wherein n is equal to 1 through 3) (hereinafter referred to as iron oxide silicate powder) or a mixture of said iron oxide silicate powder and lead compound powder. The ratio of the iron oxide silicate powder to the lead compound powder is selected according to the desired surface density of the noise insulating material.

Since the aforementioned iron oxide silicate powder has a specific gravity of 4 or more and an exceedingly high affinity for the binder resin, it can be incorporated in the binder resin with a high loading factor and makes for satisfactory processability. As an example of such iron oxide silicate powder, there may be mentioned copper refining by-product iron concentration slag. The iron concentration slag as a by-product of copper refining is obtained by adding silicon dioxide and oxygen to a matte from an autogenous blast furnace in a copper refining process for its silicification and oxidation in a converter to form a slag, subjecting the slag to electromagnetic separation, subjecting the resulting slag to ore floatation to separate copper concentrates from iron concentrate slag, and subjecting the latter to dehydration.

This copper refining by-product iron concentration slag is predominantly composed of 2FeO·SiO$_2$ (40–50 wt.% of FeO and 15-30 wt.% of $SiO_2$) and contains 10 to 30 weight % of $Fe_3O_4$, about 5 weight % of $Fe_2O_3$ and up to 5 weight % of MgO and CaO. This iron concentration slag has undergone a floatation process and being pulverized particles up to 100 mesh, does not require re-pulverization. The bulk density of this slag is in the range of 3 to 4 and its specific gravity is 4.0 to 4.2. Therefore, the slag is a well performing filler for noise insulating materials. Furthermore, since this is a by-product of copper refining, it is available at low cost and in large quantities.

The iron concentration slag has a high affinity for binder resin, thus permitting a high-density loading and giving a noise insulating material with a surface density up to about 3.0. In order to manufacture a noise insulating material with a still higher surface density, powders of lead compounds may be used in combination with the slag.

The powdery lead compound may for example be lead monoxide, lead hydroxide, trilead tetroxide, dilead trioxide, lead dioxide, lead suboxide, pentalead octoxide, lead carbonate, lead sulfate, lead sulfide or the like. Particularly preferred are lead monoxide and lead suboxide which have high specific gravities. The particle size of the powdery lead compound is preferably about 0.5 to 100 μm.

To give an example, a sound barrier filler with a specific gravity of not less than 4.3 can be easily obtained by blending a copper refining by-product iron concentration slag powder having a specific gravity of 4 to 4.2 with a lead monoxide powder having a specific gravity of 9.3.

In this instance, since the particle size of the iron concentration slag powder is larger than that of the powdery lead compound, blending of the two components causes the finer lead compound particles to be entrapped in the intergrain voids of the comparatively larger slag particles to give a uniform mixture with a reduced bulk density and a high specific gravity.

While, as described above, the combination of sound barrier filler and binder resin results in a noise insulating material having a high surface density, this invention further calls for the addition of a liquid rubber and a fire-resistant fiber. This point is an important aspect of this invention.

The liquid rubber to be used in this invention may for example be liquid chloroprene rubber (LCR), butadiene acrylonitrile rubber (NBR) or styrene butadiene rubber (SBR) and is incorporated for the purpose of imparting a greater affinity to the sound barrier filler with respect to the fire-resistant fiber to be described hereinafter. Particularly preferred is an LCR with a molecular weight of 1500 to 2500 or the NBR available from Nippon Zeon Co., Ltd. under the tradename of Hycar-1312.

The fire-resistant fiber to be used in this invention is an inorganic fiber such as glass wool, asbestos, etc. or an organic fire-resistant fiber such as phenolic resin fiber, carbon fiber, activated carbon fiber, etc. but in terms of flame retardation effect, flexibility, safety to man, and production cost, phenolic resin fiber is particularly desirable. An example of said phenolic resin fiber is a novoloid fiber which is obtainable by melt-spinning a Novolac resin and subjecting the resulting filaments to a special wet curing reaction for the formation of a three-dimensional network structure. The diameter of the fiber is 10 to 40 μm and preferably 10 to 30 μm. The length of the fiber is 0.1 to 15 mm and preferably 0.2 to 10 mm.

The incorporation of such a fire-resistant fiber in the binder resin contributes to improvements in the mechanical strength of the noise insulating material and helps prevent melting-out of the binder resin in the event of a fire.

Particularly, the use of a phenolic organic fire-resistant fiber as said fire-resistant fiber is desirable, for when the sheet is contacted with a flame, this fiber is carbonized to form a non-inflammable film, thus showing a self-extinguishing property.

Aside from the above, when the binder resin consists solely of an ethylene-vinyl acetate copolymer, it is preferable to add an inorganic hydrous compound. The inorganic hydrous compound mentioned just above may for example be aluminum hydroxide, magnesium hydroxide, basic magnesium carbonate, calcium hydroxide, barium hydroxide, clay, calcium carbonate, dolomite (magnesium carbonate-calcium carbonate), hydrotalcite [$Mg_{4.5} Al_2(OH)_{13}CO_3 \cdot 3.5H_2O$], zeolite or the like. These compounds impart higher flame retardation property to the noise insulating material. Particularly preferred is magnesium hydroxide.

When a vinyl chloride resin is contained in the binder resin, the addition of antimony trioxide as an auxiliary flame retardant contributes to an improved flame resistance.

The proportions of the above-mentioned various components in the noise insulating material of this invention will be defined below.

When an ethylene-vinyl acetate copolymer alone is used as the binder resin and the iron oxide silicate powder alone as the sound barrier filler, the proportion of the iron oxide silicate powder is 400 to 1500 parts by weight and preferably 600 to 1200 parts by weight to each 100 parts by weight of the ethylene-vinyl acetate copolymer. With less than 400 parts by weight of the iron oxide silicate powder, the surface density of the noise insulating material will not be sufficiently large and the sound insulation performance be low. Conversely with more than 1500 parts by weight of said powder, kneading efficiency will be poor, the resulting noise insulating material lacking in flexibility, and its mechanical strength not as high as desired.

The proportion of the liquid rubber is 10 to 100 parts by weight and preferably 40 to 60 parts by weight to each 100 parts by weight of the ethylene-vinyl acetate copolymer. With less than 10 parts by weight of the liquid rubber, it will be difficult to attain high density loading with the sound barrier filler and fire-resistant fiber. Conversely with more than 100 parts by weight of the liquid rubber, the tackiness will be increased too much to assure a neat release of the noise insulating sheet from the roll, thus affecting the processability.

The proportion of the fire-resistant fiber is 3 to 120 parts by weight and preferably 20 to 60 parts by weight to each 100 parts by weight of the ethylene-vinyl acetate copolymer. With less than 3 parts by weight of the fire-resistant fiber, the binder resin melts on exposure to a flame so that the noise insulating material tends to be disintegrated. Conversely, the use of more than 120 parts by weight of the fire-resistant fiber is not only rewardless and uneconomical but also affects the efficiency of sheet formation and the flexibility of the product sheet.

The proportion of said inorganic hydrous compound is 50 to 300 parts by weight and preferably 100 to 200 parts by weight to each 100 parts by weight of the ethylene-vinyl acetate copolymer. The use of less than 50 parts by weight of the inorganic hydrous compound fails to satisfy the flame retardation requirement. Conversely, even if an excess over 300 parts by weight is employed, the flame retardation effect reaches a saturation point and the mechanical strength is sacrificed.

When the binder resin consists solely in an ethylene-vinyl acetate copolymer and the sound barrier filler is a mixture of iron oxide silicate powder and powdery lead compound having a specific gravity of not less than 4.3, the proportion of said sound barrier filler is 600 to 1500 parts by weight and preferably 800 to 1200 parts by weight to each 100 parts by weight of the ethylene-vinyl acetate copolymer. With less than 600 parts by weight of the sound barrier filler, the desired noise insulating material with a high surface density (not less than 3.0) can hardly be obtained. Conversely, with more than 1500 parts by weight, the kneading performance is poor and the resultant noise insulating material is deficient not only in flexibility but also in mechanical strength.

The proportions of the liquid rubber, fire-resistant fiber and inorganic hydrous compound are the same as those recommended for the case in which the binder resin consists solely of an ethylene-vinyl acetate copolymer and the sound barrier filler consists solely of iron oxide silicate powder.

Then, when the binder resin is a mixture of the vinyl chloride resin, plasticizer and ethylene-vinyl acetate copolymer and/or ethylene-vinyl acetate-vinyl chloride terpolymer and the sound barrier filler consists solely of iron oxide silicate powder, the proportion of the plasticizer is 30 to 150 parts by weight and preferably 50 to 100 parts by weight to each 100 parts by weight of the vinyl chloride resin. With less than 30 parts by weight of the plasticizer, the product noise insulating material is not as flexible as desired and the sheet molding processability is poor. Conversely when the proportion of the plasticizer exceeds 150 parts by weight, the mechanical strength of the resultant noise insulating material is poor and the processability is also sacrificed.

The proportion of the ethylene-vinyl acetate copolymer and/or ethylene-vinyl acetate-vinyl chloride terpolymer is 30 to 150 parts by weight and preferably 40 to 100 parts by weight to each 100 parts by weight of the vinyl chloride resin. With less than 30 parts by weight, the resultant noise insulating material is not as flexible as desired. When the proportion exceeds 150 parts by weight, the mechanical strength of the noise insulating material is sacrificed.

The proportion of the iron oxide silicate powder is 400 to 2000 parts by weight and preferably 600 to 1800 parts by weight to each 100 parts by weight of the vinyl chloride resin. With less than 400 parts by weight of the iron oxide silicate powder, the noise insulating material lacks the required surface density and sound insulation performance. Conversely, when the proportion exceeds 200 parts by weight, the kneading performance is adversely affected and the resulting noise insulating material is inadequate in flexibility and mechanical strength.

The proportion of the liquid rubber is 10 to 100 parts by weight and preferably 40 to 60 parts by weight to each 100 parts by weight of the vinyl chloride resin. With less than 10 parts by weight of the liquid rubber, the sound barrier filler and fire-resistant fiber cannot be easily incorporated in high densities. Conversely, with an excess over 100 parts by weight, the increased tackiness of the composition makes its release from the roll difficult, affecting the sheeting efficiency.

The proportion of the fire-resistant fiber is 3 to 120 parts by weight and preferably 20 to 60 parts by weight to each 100 parts by weight of the vinyl chloride resin. With less than 3 parts by weight of the fire-resistant fiber, the binder resin melts on exposure to a flame to easily shed off. Conversely the use of more than 120 parts by weight is not only rewardless and uneconomical but adversely affects the processability and the flexibility of the product sheet.

Then, when the binder resin is a mixture of the vinyl chloride resin, plasticizer, and ethylene-vinyl acetate copolymer and/or ethylene-vinyl acetate-vinyl chloride terpolymer and the sound barrier filler is a mixture of iron oxide silicate powder and powdery lead compound having a specific gravity of not less than 4.3, the proportion of the sound barrier filler is 700 to 2000 parts by weight and preferably 800 to 1800 parts by weight to each 100 parts by weight of the vinyl chloride resin. With less than 700 parts by weight of the sound barrier filler, the desired noise insulating materials with a high surface density (not less than 3.0) can hardly be obtained. Conversely, if the proportion exceeds 2000 parts by weight, the kneading efficiency will be adversely affected and the resulting noise insulating material will be lacking in flexibility and mechanical strength.

The proportions of the plasticizer, ethylene-vinyl acetate copolymer and/or ethylene-vinyl acetate vinyl chloride terpolymer, liquid rubber and fire-resistant fiber are the same as those recommended for the composition in which the sound barrier filler consists solely of iron oxide silicate powder.

As the resin matrix is reinforced by the fire-resistant fiber in the binder resin, the melting and shedding of the binder resin in the event of a fire can be prevented. Furthermore, since this noise insulating material conforms to the requirements for quasi-incombustible materials, it can be used in a board range of applications.

The following working and comparative examples are intended to illustrate this invention in further detail and should by no means be construed as limiting the scope of the invention.

Examples 1 through 9; Comparative Examples 1 through 9

Each of the compositions shown in Table 1 was stirred in a Henschel mixer at room temperature for 3 minutes and the mixture was kneaded on a 22-inch open roll at 150° to 160° C. for 10 to 15 minutes. The resultant batch was passed through a calender to give a sheet 250 mm wide and 0.9–1.2 mm thick. The various characteristics of the sheet are shown in Table 1.

TABLE 1

| | No. | | | | | | | | | | | | | | | | | |
|---|---|---|---|---|---|---|---|---|---|---|---|---|---|---|---|---|---|---|
| | Examples | | | | | | | | | Comparative Examples | | | | | | | | |
| | 1 | 2 | 3 | 4 | 5 | 6 | 7 | 8 | 9 | 1 | 2 | 3 | 4 | 5 | 6 | 7 | 8 | 9 |
| Ethylene-vinyl acetate copolymer (Note 1) | 100 | 100 | 100 | 100 | 100 | 100 | 100 | 100 | — | 100 | 100 | 100 | 100 | 100 | — | 100 | 100 | 100 |

TABLE 1-continued

| | Examples | | | | | | | | | Comparative Examples | | | | | | | | |
|---|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 | 9 |
| (wt. parts) Ethylene-vinyl acetate copolymer (Note 2) | — | — | — | — | — | — | — | — | — | — | — | — | — | — | 100 | — | — | — |
| (wt. parts) Ethylene-vinyl acetate copolymer (Note 3) | — | — | — | — | — | — | — | — | 100 | — | — | — | — | — | — | — | — | — |
| (wt. parts) Iron concentration slag (Note 4) | 450 | 800 | 1400 | 800 | 800 | 800 | 800 | 800 | 800 | 800 | 800 | 1800 | 350 | 800 | 800 | 800 | 1400 | 1400 |
| (wt. parts) Fire-resistant fiber (Note 5) | 15 | 15 | 15 | 5 | 20 | 65 | 15 | 15 | 15 | 2 | 130 | 15 | 15 | 15 | 15 | — | 15 | 30 |
| (wt. parts) Magnesium hydroxide | 150 | 150 | 150 | 150 | 150 | 150 | 150 | 150 | 150 | 150 | 150 | 150 | 150 | 150 | 150 | 150 | 150 | 350 |
| (wt. parts) Liquid rubber (Note 6) | 50 | 50 | 50 | 50 | 50 | 50 | 30 | 80 | 50 | 50 | 50 | 50 | 50 | 5 | 30 | 50 | 120 | 50 |
| (wt. parts) Sound insulating property (surface density) | 2.35 | 2.70 | 3.04 | 2.73 | 2.68 | 2.56 | 2.76 | 2.62 | 2.72 | 2.74 | 2.41 | 3.19 | 2.54 | 2.84 | 2.72 | 2.74 | 2.88 | 2.92 |
| Processability | ○ | ○ | ○ | ○ | ○ | ○ | ○ | ○ | ○ | ○ | x | ○ | ○ | Δ | x | ○ | x | Δ |
| Flexibility | ○ | ○ | ○ | ○ | ○ | ○ | ○ | ○ | ○ | ○ | x | Δ | ○ | Δ | Δ | ○ | ○ | x |
| Flame retardation, by Tetsuken method | ○ | ○ | ○ | ○ | ○ | ○ | ○ | ○ | ○ | x | ○ | ○ | ○ | ○ | ○ | x | ○ | ○ |

Note 1: Evaslene 410P, product of Dainippon Ink and Chemicals, Inc.; VA content, 60 wt %
Note 2: Evaflex 560, product of Du Pont-Mitsui Polychemicals Co., Ltd.; VA content, 14 wt %
Note 3: Evaslene 310P, product of Dainippon Ink and Chemicals, Inc.; VA content 75 wt %
Note 4: Particle size, 200 mesh
Note 5: Phenolic resin fiber, product of Gun-ei Chemical Industry Co., Ltd. under the tradename of Kynol KF2BT; diameter, 12 μm; length, 0.2 mm
Note 6: Liquid chloroprene rubber, product of Denki Kagaku Kogyo Kabushiki Kaisha Since the sound insulation property of a noise insulating material is dependent on its surface density, this parameter was evaluated in terms of surface density.

As to flexibility, a testpiece measuring 30×70×1 mm was punched out from each sheet and bent through 180 degrees. The finding was rated on the following scale.
○: Not cracked
Δ: Cracked but not broken
x: Cracked and broken For the evaluation of processability, each of the compositions shown in Table 1 was kneaded on an open roll at 150°–160° C. for 10–15 minutes and the roll pickup, tackiness and fire-resistant fiber loadability were investigated and evaluated against the following processability criteria.
○: Good
Δ: Fair
x: Poor The flame retardation effect was determined in accordance with the combustion test method for nonmetallic materials for rolling stock use (Testuken method). Thus, a testpiece measuring 182 mm by 257 mm was held at an inclination of 45 degrees and a fuel vessel measuring 18 mm (dia.)×7 mm (high)×1 mm (thick) was placed on a base made of a material having a low thermal conductivity in such a manner that the center of the bottom of the fuel vessel would be located at a distance of 25.4 mm vertically under the center of the bottom of the testpiece. The fuel vessel was filled with 0.65 cc of ethyl alcohol and after ignition, the fuel was allowed to burn for about 1 minute and 30 seconds till complete consumption of the fuel. The results were evaluated on the following rating scale:

○: No ignition of the testpiece during combustion of the fuel; the length of the carbonization and deformation is not more than 100 mm.
x: The binder resin melts during combustion of the fuel and a hole is formed in the noise insulating material.

It is apparent that thanks to the proper combination of materials in accordance with this invention, the noise insulating materials according to Examples 1 through 9 have surface densities in the range of 2.35 to 3.04 and showed satisfactory sound insulation performances. Moreover, they were excellent in terms of flexibility, processability, and flame retardation effect as determined by the Tetsuken method.

Regarding Comparative Examples, Comparative Example 1 with a low fire-resistant fiber content failed to meet the strict flame retardation requirement of the Tetsuken method. Comparative Example 2 with a high fire-resistant fiber content was unsatisfactory in processability and flexibility. Comparative Example 3 with a high iron concentration slag content was remarkably inferior in flexibility. Comparative Example 4 with a low iron concentration slag content had a low surface density and was therefore inadequate in sound insulation effect. Because of its low liquid rubber content, Comparative Example 5 was lacking in flexibility, not to speak of difficulties in fire-resistant fiber loading. Comparative Example 6 was of poor quality because the vinyl acetate content of the ethylene-vinyl acetate copolymer was not appropriate. Comparative Example 7, which is free of fire-resistant fiber, formed a combustion hole as the material shed off. Comparative Examples 8 and 9 were both unsatisfactory because of the high liquid rubber content and high magnesium hydroxide content, respectively.

Examples 10 through 18; Comparative Examples 10 through 18

Using the compositions shown in Table 2, sheets were manufactured in the same manner as Examples 1 through 9. The various characteristics of these sheets are also shown in Table 2.

meet the strict flame retardation requirement of the Tetsuken method. Comparative Example 11 with a high fire-resistant fiber content was unsatisfactory in processability and flexibility. Comparative Example 12 with a high sound barrier filler content was lacking in flexibility. Comparative Example 13 with a low sound barrier filler content had a surface density of not more than 3.0 and was undesirable. Because of its low liquid rubber content, Comparative Example 14 was lacking

TABLE 2

| | | No. Examples | | | | | | | | |
|---|---|---|---|---|---|---|---|---|---|---|
| | | 10 | 11 | 12 | 13 | 14 | 15 | 16 | 17 | 18 |
| Ethylene-vinyl acetate copolymer (Note 1) (wt. parts) | | 100 | 100 | 100 | 100 | 100 | 100 | 100 | 100 | — |
| Ethylene-vinyl acetate copolymer (Note 2) (wt. parts) | | — | — | — | — | — | — | — | — | — |
| Ethylene-vinyl acetate copolymer (Note 3) (wt. parts) | | — | — | — | — | — | — | — | — | 100 |
| A sound barrier filler comprising a mixture of iron | Specific gravity 6.2 (wt. parts) | 700 | — | — | — | 800 | 1100 | — | 1400 | 1000 |
| concentration slag and lead monoxide dust | Specific gravity 4.9 (wt. parts) | — | 1300 | 1400 | 1100 | — | — | 1200 | — | — |
| Fire-resistant fiber (Note 4) (wt. parts) | | 15 | 15 | 15 | 5 | 20 | 65 | 15 | 15 | 15 |
| Magnesium hydroxide (wt. parts) | | 150 | 150 | 150 | 150 | 150 | 150 | 150 | 150 | 150 |
| Liquid rubber (Note 5) (wt. parts) | | 50 | 50 | 50 | 50 | 50 | 50 | 30 | 80 | 50 |
| Sound insulating property (surface density) | | 3.11 | 3.37 | 3.44 | 3.27 | 3.23 | 3.39 | 3.38 | 3.77 | 3.54 |
| Processability | | ○ | ○ | ○ | ○ | ○ | ○ | ○ | ○ | ○ |
| Flexibility | | ○ | ○ | ○ | ○ | ○ | ○ | ○ | ○ | ○ |
| Flame retardation, by Tetsuken method | | ○ | ○ | ○ | ○ | ○ | ○ | ○ | ○ | ○ |

| | | No. Comparative Examples | | | | | | | | |
|---|---|---|---|---|---|---|---|---|---|---|
| | | 10 | 11 | 12 | 13 | 14 | 15 | 16 | 17 | 18 |
| Ethylene-vinyl acetate copolymer (Note 1) (wt. parts) | | 100 | 100 | 100 | 100 | 100 | — | 100 | 100 | 100 |
| Ethylene-vinyl acetate copolymer (Note 2) (wt. parts) | | — | — | — | — | — | 100 | — | — | — |
| Ethylene-vinyl acetate copolymer (Note 3) (wt. parts) | | — | — | — | — | — | — | — | — | — |
| A sound barrier filler comprising a mixture of iron | Specific gravity 6.2 (wt. parts) | 1000 | 800 | 1600 | 500 | — | — | — | — | — |
| concentration slag and lead monoxide dust | Specific gravity 4.9 (wt. parts) | — | — | — | — | 800 | 800 | 800 | 1400 | 1400 |
| Fire-resistant fiber (Note 4) (wt. parts) | | 2 | 130 | 15 | 15 | 15 | 15 | — | 15 | 30 |
| Magnesium hydroxide (wt. parts) | | 150 | 150 | 150 | 150 | 150 | 150 | 150 | 150 | 350 |
| Liquid rubber (Note 5) (wt. parts) | | 50 | 50 | 50 | 50 | 5 | 30 | 50 | 120 | 50 |
| Sound insulating property (surface density) | | 3.58 | 2.84 | 4.06 | 2.77 | 3.15 | 3.00 | 3.02 | 3.21 | 3.24 |
| Processability | | ○ | x | Δ | ○ | Δ | x | ○ | x | Δ |
| Flexibility | | ○ | x | x | ○ | Δ | Δ | ○ | ○ | x |
| Flame retardation, by Tetsuken method | | x | ○ | ○ | ○ | ○ | ○ | x | ○ | ○ |

Note 1: Evaslene 410P, product of Dainippon Ink and Chemicals, Inc.; VA content, 60 wt %
Note 2: Evaflex 560, product of Du Pont-Mitsui Polychemicals Co., Ltd.; VA content, 14 wt %
Note 3: Evaslene 310P, product of Dainippon Ink and Chemicals, Inc.; VA content 75 wt %
Note 4: Phenolic resin fiber, product of Gun-ei Chemical Industry Co., Ltd. under the tradename of Kynol KF2BT; diameter, 12 μm; length, 0.2 mm
Note 5: Liquid chloroprene rubber, product of Denki Kagaku Kogyo Kabushiki Kaisha It is apparent that thanks to the proper combination of materials in accordance with this invention, the noise insulating materials according to Examples 10 through 18 had surface densities in the range of 3.11 to 3.77 and showed satisfactory sound insulation performances. Moreover, they were excellent in terms of flexibility, processability, and flame retardation effect as determined by the Tetsuken method.

Regarding Comparative Examples, Comparative Example 10 with a low fire-resistant fiber content failed to in flexibility, not to speak of difficulties in fire-resistant fiber loading. Comparative Example 15 was of poor quality because the vinyl acetate content of the ethylene-vinyl acetate copolymer was not appropriate. Comparative Example 16, which was free of fire-resistant fiber, formed a combustion hole as the material shed off. Comparative Examples 17 and 18 were both unsatisfactory because of the high liquid rubber content and high magnesium hydroxide content, respectively.

Examples 19 through 29; Comparative Examples 19 through 25

Each of the compositions shown in Table 3 was kneaded on a 8-inch open roll at 150° to 160° C. for 10 to 15 minutes. A sheet 200 mm wide and about 1 mm thick was prepared. The various characteristics of the sheet are shown in Table 3.

Note 8: Phenolic resin fiber, product of Gun-ei Chemical Industry Co., Ltd. under the tradename of Kynol KF2BT; diameter, 12 μm; length, 0.2 mm It is apparent that thanks to the proper combination of materials in accordance with this invention, the noise insulating materials according to Examples 19 through 29 had surface densities in the range of 2.38 to 2.99 and showed satisfactory sound insulation performances.

TABLE 3

|  | Examples |  |  |  |  |  |  |  |  |  |  | Comparative Examples |  |  |  |  |  |  |
|---|---|---|---|---|---|---|---|---|---|---|---|---|---|---|---|---|---|---|
|  | 19 | 20 | 21 | 22 | 23 | 24 | 25 | 26 | 27 | 28 | 29 | 19 | 20 | 21 | 22 | 23 | 24 | 25 |
| Vinyl chloride resin (Note 1) (wt. parts) | 100 | 100 | 100 | 100 | 100 | 100 | 100 | 100 | — | — | — | 100 | 100 | 100 | 100 | 100 | 100 | 100 |
| Ethylene-vinyl chloride copolymer (Note 2) (wt. parts) | — | — | — | — | — | — | — | — | 100 | — | — | — | — | — | — | — | — | — |
| Vinyl acetate-vinyl chloride copolymer (Note 3) (wt. parts) | — | — | — | — | — | — | — | — | — | 100 | — | — | — | — | — | — | — | — |
| Urethane-vinyl chloride copolymer (Note 4) (wt. parts) | — | — | — | — | — | — | — | — | — | — | 100 | — | — | — | — | — | — | — |
| Ethylene-vinyl acetate copolymer (Note 5) (wt. parts) | — | 50 | 100 | 40 | 25 | — | 70 | 50 | 50 | 50 | 50 | 50 | 50 | 10 | 10 | 50 | 50 | — |
| Ethylene-vinyl acetate-vinyl chloride terpolymer (Note 6) (wt. parts) | 50 | 50 | — | — | 25 | 50 | 70 | 50 | — | — | — | — | — | — | 10 | 50 | — | 160 |
| Plasticizer (DOP) (wt. parts) | 50 | 50 | 50 | 100 | 100 | 100 | 50 | 100 | 100 | 100 | 100 | 50 | 50 | 50 | 100 | 100 | 160 | 50 |
| Iron concentration slag (wt. parts) | 500 | 1500 | 1500 | 1000 | 1200 | 1200 | 1900 | 1900 | 1500 | 1500 | 1500 | 300 | 2100 | 600 | 1200 | 2100 | 1000 | 1000 |
| Liquid rubber (Note 7) (wt. parts) | 30 | 12 | 20 | 60 | 30 | 80 | 25 | 15 | 20 | 10 | 10 | 30 | 30 | 40 | 30 | 5 | 20 | 120 |
| Fire-resistant fiber (Note 8) (wt. parts) | 20 | 10 | 40 | 80 | 30 | 30 | 5 | 5 | 10 | 10 | 10 | 30 | 2 | 120 | 5 | 30 | 10 | 10 |
| Antimony trioxide (wt. parts) | 5 | 5 | 5 | — | 5 | — | 5 | 5 | 5 | 5 | 5 | 5 | 5 | — | 5 | — | 5 | — |
| Sound insulating property (surface density) | 2.57 | 2.93 | 2.82 | 2.38 | 2.65 | 2.57 | 2.99 | 2.92 | 2.85 | 2.90 | 2.87 | 1.89 | 3.22 | 2.21 | 2.80 | 2.96 | 2.40 | 2.33 |
| Flexibility | o | o | o | o | o | o | o | o | o | o | o | o | x | x | Δ | x | o | Δ |
| Processability | o | o | o | o | o | o | o | o | o | o | o | o | o | Δ | Δ | Δ | x | x |
| Flame retardation, by Tetsuken method | o | o | o | o | o | o | o | o | o | o | o | o | x | o | o | o | o | o |

Note 1: PVC (SG-1400), product of Ryojitsu K.K.; average degree of polymerization, 1400

Note 2: PVC (E-1300), product of Toyo Soda Manufacturing Co., Ltd.; average degree of polymerization, 1300

Note 3: PVC (MC-1000), product of Shin-Etsu Chemical Co., Ltd.; average degree of polymerization, 1000

Note 4: Aron NP 3000, product of Toa Gosei Chemical Industry Co., Ltd.

Note 5: EVA (Evaflex 45X), product of Du Pont-Mitsui Polychemicals Co., Ltd.; VA content=45 wt %

Note 6: EVA-VC (Graftmer R-5), product of Nippon Zeon Co., Ltd.; EVA content=50 wt %

Note 7: Liquid chloroprene rubber, product of Denki Kagaku Kogyo Kabushiki Kaisha Moreover, they were excellent in terms of flexibility, processability, and flame retardation effect as determined by the Tetsuken method.

Because of the inappropriate iron concentration slag content, the noise insulating material of Comparative Example 19 showed a low surface density. Comparative Example 20 with a low fire-resistant fiber content was lacking in flame retardant property. Comparative Example 21 with a high fire-resistant fiber content was unsatisfactory in flexibility and processability. Comparative Example 22 was insufficient in the total amount of ethylene-vinyl acetate copolymer and ethylene-vinyl acetate-vinyl chloride terpolymer and was, therefore, unsatisfactory in flexibility and processability. Comparative Example 23 with an insufficient liquid rubber content was lacking in flexibility. Comparative Examples 24 and 25 were both unsatisfactory in processability because of the high plasticizer content and high liquid rubber content, respectively.

Examples 30 through 40; Comparative Examples 26 through 32

Using the compositions shown in Table 4, sheets were manufactured in the same manner as Examples 19 through 29. The various characteristics of these sheets are also shown in Table 4.

Note 2: PVC (E-1300), product of Toyo Soda Manufacturing Co., Ltd.
Note 3: PVC (MC-1000), product of Shin-Etsu Chemical Co., Ltd.
Note 4: Aron NP 3000, product of Toa Gosei Chemical Industry Co., Ltd.
Note 5: EVA (Evaflex 45X), product of Du Pont-Mitsui Polychemicals Co., Ltd.; VA content=45 wt %

TABLE 4

| | | | | | | No. Examples | | | | | | |
|---|---|---|---|---|---|---|---|---|---|---|---|---|
| | | 30 | 31 | 32 | 33 | 34 | 35 | 36 | 37 | 38 | 39 | 40 |
| Vinyl chloride resin (Note 1) (wt. parts) | | 100 | 100 | 100 | 100 | 100 | 100 | 100 | 100 | — | — | — |
| Ethylene-vinyl chloride copolymer (Note 2) (wt. parts) | | — | — | — | — | — | — | — | — | 100 | — | — |
| Vinyl acetate-vinyl chloride copolymer (Note 3) (wt. parts) | | — | — | — | — | — | — | — | — | — | 100 | — |
| Urethane-vinyl chloride copolymer (Note 4) (wt. parts) | | — | — | — | — | — | — | — | — | — | — | 100 |
| Ethylene-vinyl acetate copolmer (Note 5) (wt. parts) | | — | 50 | 100 | 40 | 25 | — | 70 | 50 | 50 | 50 | 50 |
| Ethylene-vinyl acetate-vinyl chloride terpolymer (Note 6) (wt. parts) | | 50 | 50 | — | — | 25 | 50 | 70 | 50 | — | — | — |
| Plasticizer (DOP) (wt. parts) | | 50 | 50 | 50 | 100 | 100 | 100 | 50 | 100 | 100 | 100 | 100 |
| A sound barrier filler comprising a mixture of iron | Specific gravity 6.2 (wt. parts) | 800 | 1500 | 1500 | — | 1200 | 1200 | 1900 | — | 1500 | 1500 | 1500 |
| concentration slag and lead monoxide dust | Specific gravity 4.9 (wt. parts) | — | — | — | 1600 | — | — | — | 1900 | — | — | — |
| Liquid rubber (Note 7) (wt. parts) | | 30 | 30 | 30 | 60 | 30 | 30 | 30 | 15 | 20 | 30 | 30 |
| Fire-resistant fiber (Note 8) (wt. parts) | | 20 | 10 | 40 | 80 | 30 | 30 | 5 | 5 | 10 | 10 | 10 |
| Antimony trioxide (wt. parts) | | — | 10 | — | — | — | — | 10 | 10 | — | — | — |
| Sound insulating property (surface density) | | 3.11 | 3.76 | 3.58 | 3.02 | 3.09 | 3.12 | 3.87 | 3.30 | 3.63 | 3.71 | 3.67 |
| Flexibility | | ○ | ○ | ○ | ○ | ○ | ○ | ○ | ○ | ○ | ○ | ○ |
| Processability | | ○ | ○ | ○ | ○ | ○ | ○ | ○ | ○ | ○ | ○ | ○ |
| Flame retardation, by Tetsuken method | | ○ | ○ | ○ | ○ | ○ | ○ | ○ | ○ | ○ | ○ | ○ |

| | | No. Comparative Examples | | | | | | |
|---|---|---|---|---|---|---|---|---|
| | | 26 | 27 | 28 | 29 | 30 | 31 | 32 |
| Vinyl chloride resin (Note 1) (wt. parts) | | 100 | 100 | 100 | 100 | 100 | 100 | 100 |
| Ethylene-vinyl chloride copolymer (Note 2) (wt. parts) | | — | — | — | — | — | — | — |
| Vinyl acetate-vinyl chloride copolymer (Note 3) (wt. parts) | | — | — | — | — | — | — | — |
| Urethane-vinyl chloride copolymer (Note 4) (wt. parts) | | — | — | — | — | — | — | — |
| Ethylene-vinyl acetate copolmer (Note 5) (wt. parts) | | 50 | 50 | 10 | 10 | 50 | 50 | — |
| Ethylene-vinyl acetate-vinyl chloride terpolymer (Note 6) (wt. parts) | | — | — | — | 10 | 50 | — | 160 |
| Plasticizer (DOP) (wt. parts) | | 50 | 50 | 50 | 100 | 100 | 160 | 50 |
| A sound barrier filler comprising a mixture of iron | Specific gravity 6.2 (wt. parts) | — | 2100 | 800 | — | 2100 | — | — |
| concentration slag and lead monoxide dust | Specific gravity 4.9 (wt. parts) | 600 | — | — | 1200 | — | 1000 | 1000 |
| Liquid rubber (Note 7) (wt. parts) | | 30 | 30 | 40 | 30 | 5 | 20 | 120 |
| Fire-resistant fiber (Note 8) (wt. parts) | | 30 | 2 | 120 | 5 | 30 | 10 | 10 |
| Antimony trioxide (wt. parts) | | — | — | — | — | — | — | — |
| Sound insulating property (surface density) | | 2.49 | 4.33 | 2.84 | 3.13 | 3.83 | 2.61 | 2.51 |
| Flexibility | | ○ | x | x | Δ | x | ○ | Δ |
| Processability | | ○ | ○ | Δ | Δ | Δ | x | x |
| Flame retardation, by Tetsuken method | | ○ | x | ○ | ○ | ○ | ○ | ○ |

Note 1: PVC (SG-1400), product of Ryojitsu K.K.

Note 6: EVA-VC (Graftmer R-5), product of Nippon Zeon Co., Ltd.; EVA content=50 wt %

Note 7: Liquid chloroprene rubber, product of Denki Kagaku Kogyo Kabushiki Kaisha Note 8: Phenolic resin fiber, product of Gun-ei Chemical Industry Co., Ltd. under the tradename of Kynol KF2BT; diameter, 12 μm; length, 0.2 mm It is apparent that thanks to the proper combination of materials in accordance with this invention, the noise insulating materials according to Examples 30 through 40 had surface densities in the range of 3.02 to 3.87 and showed satisfactory sound insulation performances. Moreover, they were excellent in terms of flexibility, processability, and flame retardation effect as determined by the Tetsuken method.

Because of the inappropriate sound barrier filler content, the noise insulating material of Comparative Example 26 showed a low surface density of not more than 3.0 and, therefore, was undesirable. Comparative Example 27 with a low fire-resistant fiber content was lacking in flame retardant property. Comparative Example 28 with a low ethylene-vinyl acetate copolymer content was unsatisfactory in flexibility and processability. Comparative Example 29 was insufficient in the total amount of ethylene-vinyl acetate copolymer and ethylene-vinyl acetate-vinyl chloride terpolymer and, therefore, was unsatisfactory in flexibility and processability. Comparative Example 30 with an insufficient liquid rubber content was lacking in flexibility. Comparative Examples 31 and 32 were both unsatisfactory in processability because of the high plasticizer content and high liquid rubber content, respectively.

The noise insulating materials of Examples 1 though 40 are conforming to the requirements of the surface test and perforation test provided in the Rules for Enforcement of the Architectural Standard Act as promulgated by Ministry of Construction Decree No. 1231.

What is claimed is:

1. A noise insulating material comprising a mixture of binder resin, a sound barrier filler, fire-resistant fiber and a liquid rubber,
   (a) said binder resin being an ethylene-vinyl acetate copolymer with a vinyl acetate content of not less than 15 weight percent;
   (b) said sound barrier filler comprising an iron oxide silicate powder composed of 50 to 80 weight percent of iron oxide, 15 to 30 weight percent of silicon oxide and not more than 10 weight percent of at least one oxide selected from the group consisting of alkali metal oxides and alkaline earth metal oxides, with not less than 50 percent of said iron oxide and silicon oxide being in the form of nFeO·SiO$_2$ or
   (c) said free-resistant fiber being at least one member selected from the group consisting of glass wool, asbestos, phenolic resin fiber, carbon fiber and activated carbon fiber; and
   (d) said liquid rubber being at least one member selected from the group consisting of liquid chloroprene rubber, butadiene-acrylonitrile rubber, and styrene-butadiene rubber.

2. A noise insulating material according to claim 1 in which the mixture further comprises an inorganic hydrous compound.

3. A noise insulating material according to claim 2 in which said sound barrier filler is iron oxide silicate powder and, based on 100 parts by weight of the ethylene-vinyl acetate copolymer, the noise insulating material contains 10 to 100 parts by weight of said liquid rubber, 400 to 1500 parts by weight of said iron oxide silicon powder, 3 to 120 parts by weight of said fire-resistant fiber and 50 to 300 parts by weight of said inorganic hydrous compound.

4. A noise insulating material according to claim 2 in which said sound barrier filler is a mixture consisting of said iron oxide silicate powder and powdery lead compound and having a specific gravity of not less than 4.3 and, based on 100 parts by weight of said ethylene-vinyl acetate copolymer, the noise insulating material contains 600 to 1500 parts by weight of said sound barrier filler, 10 to 100 parts by weight of said liquid rubber, 3 to 120 parts by weight of said fire-resistant fiber and 50 to 300 parts by weight of said inorganic hydrous compound.

5. A noise insulating material according to claim 1 wherein said sound barrier filler further comprises powdery lead compound in admixture with the iron oxide silicate powder, the mixture having a specific gravity of not less than 4.3.

6. A noise insulating material comprising a mixture of a binder resin, a sound barrier filler, fire-resistant fiber and a liquid rubber,
   (a) said binder resin being a mixture of a vinyl chloride resin, a plasticizer and at least one vinyl acetate-containing polymeric material selected from the group consisting of ethylene-vinyl acetate copolymers with a vinyl acetate content of not less than 15 weight percent and ethylene-vinyl acetate-vinyl chloride terpolymers with a vinyl acetate content of not less than 15 weight percent;
   (b) said sound barrier filler comprising an iron oxide silicate powder composed of 50 to 80 weight percent of iron oxide, 15 to 30 weight percent of silicon oxide and not more than 10 weight percent of at least one oxide selected from the group consisting of alkali metal oxide and alkaline earth metal oxides, with not less than 50 percent of said iron oxide and silicon oxide being in the form of nFeO·SiO$_2$ or nFeO·Fe$_2$O$_3$·SiO$_2$, wherein n is equal to 1 through 3;
   (c) said fire-resistant fiber being at least one member selected from the group consisting of glass wool, asbestos, phenolic resin fiber, carbon fiber and activated carbon fiber; and
   (d) said liquid rubber being at least one member selected from the group consisting of liquid chloroprene rubber, butadiene-acrylonitrile rubber, and styrene-butadiene rubber.

7. A noise insulating material according to claim 6 in which said vinyl chloride resin is polyvinyl chloride, ethylene-vinyl chloride copolymer, vinyl acetate-vinyl chloride copolymer or urethane-vinyl chloride copolymer.

8. A noise insulating material according to claim 6 in which, based on 100 parts by weight of said vinyl chloride resin, the noise insulating material contains 30 to 150 parts by weight of said plasticizer, 30 to 150 parts by weight of said vinyl acetate-containing polymeric material, 400 to 2000 parts by weight of said iron oxide silicate powder, 10 to 100 parts by weight of said liquid rubber and 3 to 120 parts by weight of said fire-resistant fiber.

9. A noise insulating material according to claim 6 in which said sound barrier filler is a mixture consisting of said iron oxide silicate powder and powdery lead compound and having a specific gravity of not less than 4.3 and, based on 100 parts by weight of said vinyl chloride resin, the noise insulating material contains 30 to 150 parts by weight of said plasticizer, 30 to 150 parts by weight of said vinyl acetate-containing polymeric material, 700 to sound barrier filler, 10 to 100 parts by weight of said liquid rubber and 3 to 120 parts by weight of said fire-resistant fiber.

10. A noise insulating material according to claim 6 wherein said sound barrier filler further comprises powdery lead compound in admixture with the iron oxide silicate powder, the mixture having a specific gravity of not less than 4.3.

* * * * *